US011440599B2

(12) United States Patent
Scruggs et al.

(10) Patent No.: US 11,440,599 B2
(45) Date of Patent: Sep. 13, 2022

(54) FIFTH WHEEL HITCH COMFORT SYSTEM

(71) Applicant: HORIZON GLOBAL AMERICAS INC., Plymouth, MI (US)

(72) Inventors: Mark Scruggs, Plymouth, MI (US); Curt Nowack, Plymouth, MI (US); Derek Jolly, Plymouth, MI (US); Gregoire Mercier, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 366 days.

(21) Appl. No.: 16/615,876

(22) PCT Filed: May 23, 2018

(86) PCT No.: PCT/US2018/034057
§ 371 (c)(1),
(2) Date: Nov. 22, 2019

(87) PCT Pub. No.: WO2018/217848
PCT Pub. Date: Nov. 29, 2018

(65) Prior Publication Data
US 2020/0239089 A1      Jul. 30, 2020

Related U.S. Application Data

(60) Provisional application No. 62/509,802, filed on May 23, 2017, provisional application No. 62/509,800, filed on May 23, 2017.

(51) Int. Cl.
*B62D 53/10* (2006.01)
*B60D 1/48* (2006.01)
(Continued)

(52) U.S. Cl.
CPC ............... *B62D 53/10* (2013.01); *B60D 1/48* (2013.01); *B62D 53/0807* (2013.01);
(Continued)

(58) Field of Classification Search
CPC . B60D 1/01; B60D 1/52; B60D 1/015; B60D 1/485; B60D 1/488; B60D 1/48;
(Continued)

(56) References Cited

U.S. PATENT DOCUMENTS 5,513,869 A   5/1996  Putnam
5,722,729 A   6/1998  Cattau
(Continued)

OTHER PUBLICATIONS

Patent Cooperation Treaty (PCT), International Search Report and Written Opinion for Application PCT/US2018/034057 filed May 23, 2018, dated Jul. 30, 2018, International Searching Authority, US.

*Primary Examiner* — Jacob B Meyer
*Assistant Examiner* — Marlon A Arce
(74) *Attorney, Agent, or Firm* — McDonald Hopkins LLC

(57) ABSTRACT

A fifth wheel hitch assembly for mounting to a towing vehicle and receiving a kingpin of a trailer incorporating a comfort assembly is provided. The fifth wheel hitch assembly may comprise a kingpin receiving assembly attached to a mounting rail via a comfort assembly. The comfort assembly may include one or more pivot bushing assemblies, as well as vertically adjustable, anti-rattle attachment systems. These attachment systems may include a cam assembly and/or a T-pin assembly.

10 Claims, 8 Drawing Sheets

(51) Int. Cl.
  *B62D 53/08*  (2006.01)
  *B62D 53/04*  (2006.01)
  *B60D 1/52*   (2006.01)
  *B62D 53/00*  (2006.01)
  *B60D 1/01*   (2006.01)

(52) U.S. Cl.
  CPC ............ *B62D 53/0842* (2013.01); *B60D 1/01* (2013.01); *B60D 1/52* (2013.01); *B62D 53/00* (2013.01); *B62D 53/04* (2013.01)

(58) Field of Classification Search
  CPC ........ B62D 53/00; B62D 53/04; B62D 53/08; B62D 53/0814; B62D 53/0828; B62D 53/10; B62D 53/0807; B62D 53/0842
  See application file for complete search history.

(56) References Cited

U.S. PATENT DOCUMENTS

| | | | |
|---|---|---|---|
| 6,065,766 A * | 5/2000 | Pulliam | F16B 21/04 280/415.1 |
| 8,215,658 B2 * | 7/2012 | Stanifer | B60D 1/28 280/491.5 |
| 9,452,647 B2 * | 9/2016 | Bowe | B60D 1/18 |
| 9,931,898 B2 * | 4/2018 | McCoy | B60D 1/06 |
| 10,800,468 B2 * | 10/2020 | Standifer | F16B 37/042 |
| 10,843,513 B2 * | 11/2020 | McCoy | B60D 1/488 |
| 10,967,689 B2 * | 4/2021 | Stanifer | B60D 1/015 |
| 2005/0146116 A1 | 7/2005 | Lindenman et al. | |
| 2012/0018979 A1 * | 1/2012 | McCoy | B62D 53/0842 280/441.1 |
| 2012/0031940 A1 | 2/2012 | Leech et al. | |
| 2012/0145851 A1 | 6/2012 | McCoy | |
| 2013/0113181 A1 * | 5/2013 | Stanifer | B60D 1/182 280/432 |

\* cited by examiner

FIFTH WHEEL HITCH COMFORT SYSTEM

CROSS-REFERENCE TO RELATED APPLICATIONS

This application is a 35 U.S.C. § 371 national stage application of PCT Application No. PCT/US2018/034057 filed on May 23, 2018, entitled "FIFTH WHEEL HITCH COMFORT SYSTEM", which claims priority to U.S. provisional patent application Ser. Nos. 62/509,802 and 62/509,800, respectively entitled "Fifth Wheel Hitch Comfort System" and "Fifth Wheel Hitch Engagement System" both these applications were filed on May 23, 2017, and all are incorporated by reference herein.

The present invention relates generally to a fifth wheel hitch assembly, and more particularly, to a fifth wheel hitch assembly comprising a comfort assembly having a vertically adjustable attachment member and other "anti-rattle" components and features.

BACKGROUND

Fifth wheel hitches are used with a towing vehicle, such as a pick-up truck, to engage a towed vehicle for towing. In this context, the fifth wheel hitches involve universal products that are typically operated by untrained operators, and may be configured to connect trailers to pickup trucks for a load range of about 7,000 lbs. up to about 32,000 lbs. or even more. Current fifth wheel hitches give limited to no feedback to the operator. Operators have to rely on visual feedback to determine the state of the coupling, which offers certain challenges.

These types of connections are prone to giving secondary load feedback through the towing vehicle occupants either in single, repeatable or oscillatory manner. Over the years, various products have been developed to resolve the issue. These, however, resulted in either trading noise for comfort or further customer dissatisfaction factors. Current fifth wheel hitches are limited in their flexibility. If the customers buy a new or different towing vehicle, there may not be an option to transfer the fifth wheel to the different towing vehicle unless the mounting system is identical. The proliferation of non-standard under bed structures means that these parts are becoming more and more application specific.

In view of these shortcomings, there is a need for an improved fifth wheel hitch to overcome the afore-mentioned shortcomings.

SUMMARY

The present disclosure contemplates a fifth wheel hitch with improved comfort and ease of use for its operator. In its broadest forms, the system may include a) clear operator controls and sensor states, b) elimination of negative audible noise events, c) improved operator interfaces, d) adjustable, pivoting fittings for the jaw assembly, and e) the ability to make minute adjustment to the vertical, longitudinal, and/or transverse positioning of the hitch assembly's legs, handle, or other components.

In one aspect, the comfort assembly for attaching the fifth wheel hitch assembly may include a vertically adjustable, anti-rattle attachment having a cam assembly with any combination of the following:

an attachment bolt having a foot end and an opposing upper end, said bolt received through an aperture in a base plate associate with the fifth wheel hitch;

wherein the foot end includes a loop with opposing flattened faces, said flattened faces cooperating to be received within the mounting slot so that a pull pin, when inserted through the side connection aperture proximate to the mounting rail, passes through the loop;

wherein the upper end includes a threaded portion to receive a fastener, said fastener being selectively coupled to the portion so as to adjust a vertical positioning of the assembly.

a cam lever having a cam barrel rotatable in response to movement of the cam lever and wherein the attachment bolt passes through the cam barrel so that the cam barrel is positioned between the fastener and the base plate;

wherein the cam lever includes a looped protrusion having flattened faces cooperating to be received by a second mounting slot on a top facing of the mounting rail proximate to the mounting slot so that a second pull pin, when inserted through a second side connection aperture proximate to the second mounting slot, passes through the looped protrusion;

wherein the cam barrel is integrated as a single piece with the fastener;

a faucet knob engaging the fastener so as to rotate in concert therewith;

In another aspect, the comfort assembly for attaching the fifth wheel hitch assembly may include a vertically adjustable, anti-rattle attachment having a T-pin assembly with any combination of the following:

a T-pin having a foot end and an opposing upper end, said T-pin received through an aperture in a base plate associate with the fifth wheel hitch;

wherein the foot end includes an elongated base having a pair of opposing shoulder, said shoulders cooperating to be received within the mounting slot and sized so as to allow for rotation of the elongated base within an inner channel along an underside of the mounting rail;

wherein a pull pin is selectively received through the side connection aperture proximate to the mounting rail, said pull pin engaging the elongated base to prevent rotation of the T-pin, wherein the upper end includes a threaded portion to receive a fastener, said fastener being selectively coupled to the portion so as to adjust a vertical positioning of the assembly.

a handle assembly having a keyway aperture, said keyway aperture receiving the upper end of the T-pin;

wherein the keyway aperture is integrated as a single piece with the fastener;

wherein the handle includes a second aperture that receives a locking pin to prevent rotation of the handle when the locking pin is inserted in the second aperture;

wherein the keyway engages the upper end to selectively rotate the T-pin so as to secure the elongated based in the mounting rail;

Finally, the comfort assembly for attaching the fifth wheel hitch assembly may include a pivot bushing, either alone or in combination with the aforementioned vertically adjustable attachment systems. This version of the comfort assembly includes any combination of the following:

a kingpin receiving assembly including a top plate, a first frame member, and a second frame member;

a mounting rail configured to receive the kingpin receiving assembly; and a comfort assembly comprising at least one pivot bushing assembly configured to selectively and adjustably engage the first frame member with the second frame member of the kingpin receiving assembly, the pivot bushing assembly including a bolt fitted through a sleeve, said bolt threadedly engaging an end cap to compress the sleeve and vertically adjustable attachment assembly configured to couple the kingpin receiving assembly with the mounting rail;

wherein a pair of pivot bushing assemblies are disposed includes a sleeve made of a polymeric material;

wherein the mounting rail is configured to couple to a vertically adjustable, anti-rattle attachment assembly comprising a cam assembly and/or a T-pin assembly; and a universal mounting apparatus configured to be significantly universal and be adapted to a wide variety of the towing vehicle types and models.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

BRIEF DESCRIPTION OF THE DRAWINGS

Operation of the present disclosure may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein. In the drawings.

DETAILED DESCRIPTION

Figure 1A:
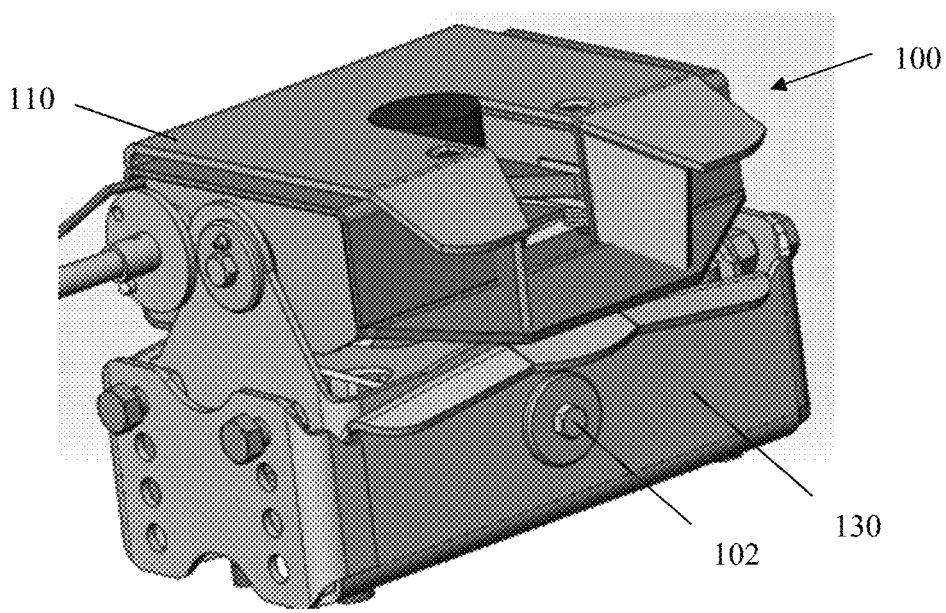
FIG. 1A is a perspective view of a fifth wheel hitch, including a kingpin receiving assembly, with pivot bushings in accordance with various embodiments described herein.

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Generally speaking, a fifth wheel hitch assembly may comprise a kingpin receiving assembly and at least one mounting rail configured to receive the kingpin receiving assembly. The kingpin receiving assembly may include a top plate, a first frame member, and a second frame member. One aspect of the comfort system is a pivot bushing assembly configured to selectively and adjustably engage the first frame member with the second frame member of the kingpin receiving assembly which, itself, may pivot. The at least one pivot bushing assembly may include a sleeve made of a polymeric material. Moreover, the cam member of the at least one cam assembly may comprise a first and a second apertures configured to engage the at least one rail pin member with the mounting rail therethrough.

The comfort assembly may also include a vertically adjustable connection member, including a threaded bolt fitted through a slot in the mounting rail and securing a base plate that attaches to the fifth wheel hitch itself. In one aspect, at least one cam assembly is configured to selectively and adjustably engage the kingpin receiving assembly with the mounting rail. The at least one cam assembly may comprise a cam member including a cam lever and a cam barrel, a fastening member, and at least one rail pin member, wherein the cam member of the at least one cam assembly engages the fastening member with the mounting rail. Separately, an end-threaded T-pin operates in conjunction with a castle nut and a handle having a key way to achieve the same ends. Finally, a capture pin fastening member includes an aperture in a terminal slot loop, along with a castle nut.

In addition, the fifth wheel hitch assembly may further comprise a hitch handle with an elongated body configured to provide an easy access. The fifth wheel hitch assembly may further comprise a universal mounting apparatus configured to be significantly universal and be adapted to a wide variety of the towing vehicle types and models.

It is noted that the various embodiments described herein may include other components and/or functionality. It is further noted that while various embodiments refer to a fifth wheel hitch and kingpin engagement, various other systems may be utilized in view of embodiments described herein. Further, the present system may include a variety of components, not limited to the components discussed below. Optionally, the present system may include multiple units of the same components. In an embodiment, the present system may include just the fifth wheel hitch described herein. Further, the present system may include components of each of the fifth wheel hitch and kingpin to create a combination of each feature of the various systems.

Anti-Rattling, Pivot Bushing

Figure 1B:
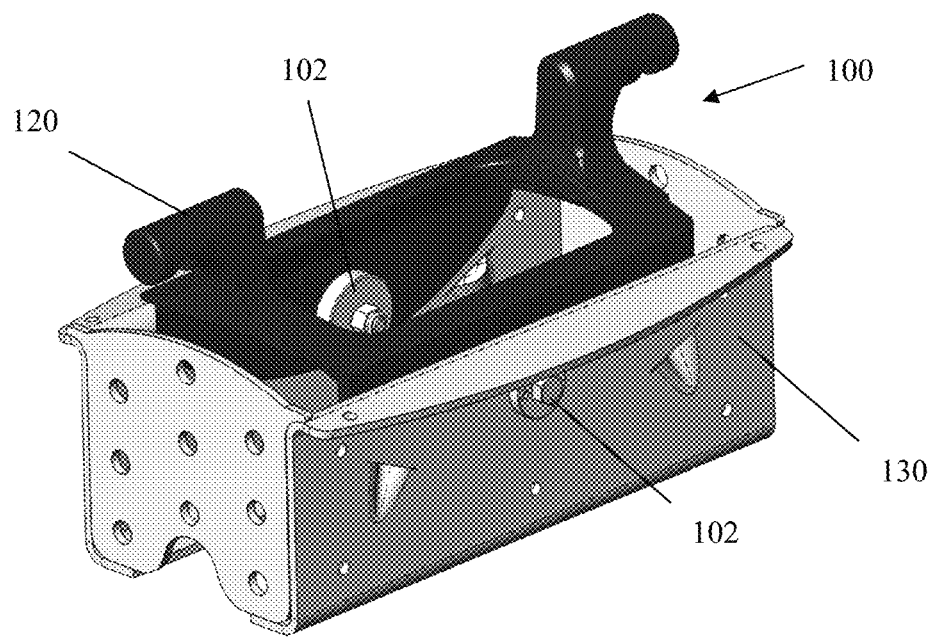
FIG. 1B is a perspective, sectional view of a fifth wheel hitch indicating the front and rear pivot bushings in accordance with various embodiments described herein.

A kingpin receiving assembly 100 of a fifth wheel is shown and described herein. The kingpin receiving assembly 100 may comprises a pivot bushing assembly 102 (preferably, the kingpin receiving assembly 100 includes a pair of pivot bushing assemblies 102). As shown in FIGS. 1A and 1B, the kingpin receiving assembly 100 may include a top plate 110 carried on a first frame member 120, and a second frame member 130. The top plate 110 may be a landing/skid plate configured to receive and connect the fifth wheel head. The first frame member 120 may be saddle-likely shaped and can be located inside a second frame member 130.

The pivot bushing assembly 102 transmits a shear stress from the fifth wheel head and further distributes these forces along the frame members 120, 130. The one pivot bushing assembly 102 selectively and adjustably engages the first frame member 120 with the second frame member 130 of the kingpin receiving assembly. FIGS. 1A and 1B show example, non-limiting front and rear pivot bushing assemblies 102 as described below.

The pivot bushing assembly allows a higher shear strength of the pin inserted through the second frame member 130. The first frame member 120 may pivot with respect to the second frame member 130 about the front and rear pivot bushing assemblies 102. The front and rear pivot bushing assemblies 102 may allow higher shear strength during operation of the kingpin receiving assembly 100. The front and rear pivot bushing assemblies 102 may allow separate isolation fore and aft. The front and rear pivot bushing assemblies 102 may allow vertical forces to be a metal on metal contact, which may provide additional strength. The front and rear pivot bushing assemblies 102 may be a serviceable part, i.e., it may be replaced. The front and rear pivot bushing assemblies 102 may be tunable part, i.e., one can adjust stiffness or adjust the gap present to adjusting the functioning of the front and rear pivot bushing assemblies 102.

More specifically, the pivot bushing assembly 102 may transmit shear load during operation of the fifth wheel hitch. The bolt or pin inserted therethrough is no longer the limiting factor as to the forces that may be applied. Instead, the front pivot bushing assembly 102 may support the load. As the structure of the pivot bushing assembly 102 may be more stout than the pin or bolt itself, this may allow for the additional shear load.

The pivot bushing assembly 102 may also allow for adjustment of the friction applied during operation of the fifth wheel hitch and/or dampening in rotation. This may allow a reduction or elimination of the rattle that otherwise occurs in prior art systems. The pivot bushing assembly 102 may be adjusted or tuned to provide just enough friction to avoid rattling during rotation between the first frame member 120 and second frame member 130 about the first pivot bushing assembly 102 (and/or the second pivot bushing assembly).

The pivot bushing assemblies need not be identical. As a non-limiting example, the assembly toward the front of the hitch assembly may be designed for increased strength, while the rear bushing allows for friction and/or rotation dampening. Other combinations are possible. In the description of the front and rear pivot bushing assemblies 102 may perform the same function.

Figure 2A:
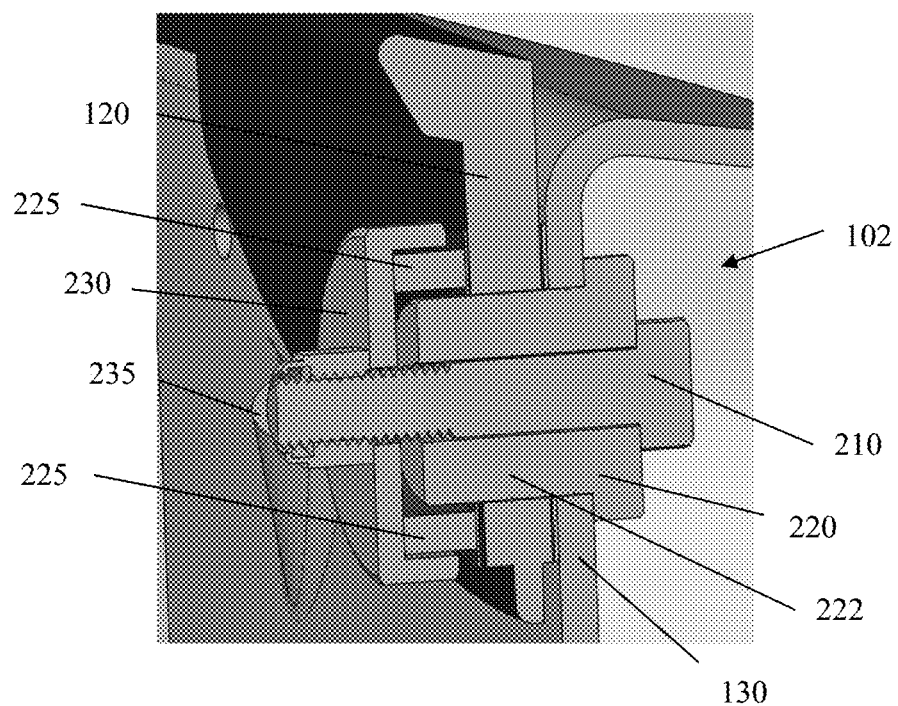
FIG. 2A is a side cross sectional view of an exemplary pivot busing in accordance with various described embodiments.

FIG. 2A shows a non-limiting exemplary embodiment of an at least one pivot bushing assembly 102 in accordance with the present disclosure. The pivot bushing assembly 102 may be similar to the configuration of either or both of the rear and front installations. The pivot bushing assembly 102 includes a bolt 210, a bushing 220, and an end cap 230, all of which may be made from a strength material such as any appropriate grade of steel or other similar metals or alloys.

The bolt 210 passes through the cylindrical bushing 220. The bushing 220 includes a generally cylindrical body portion 222 that may be of any appropriate configuration. The cylindrical body 222 may also include two flattened portions or radially projecting flanges at one or both ends (as shown, a flange is on the outside facing in contact with frame 130). A polymeric isolator 225, having a generally hollow cylindrical form conforming to that of the bolt 210 and bushing 220 combination, is positioned around the bushing 220 at one end. An end cap 230 held in place by fastener 235 partially or completely encloses the isolator 225. Notably, polymeric isolator bushing 225 creates an offset so that the end of bushing 220 and the interior cup of the end cap 230 do not necessarily come into contact, thereby reducing wear and delivering the other benefits of the assembly 102, as described herein.

The bolt 210 covered at one end with an end cap 230. A fastener 235 selectively and adjustably engages the bolt 210 (e.g., via a threaded connection) to urge the end cap 230 into compressing the polymeric bushing 225, which may be manufactured by a polymeric material (or any other appropriate elastomeric material). The polymeric material may be configured to limit the free movement, rattling movement, from the first frame member 120 and/or the second frame member 130. The bushing 225 may be configured to act to absorb vibration that may occur and reduce the friction present. This may allow for a reduction in rattling during operation of the applicable fifth wheel hitch.

The bolt 210, the bushings 220, 225, and the end cap 230, respectively, may be of any appropriate shape or size, such as having a generally tubular, square, rectangular, or the like shape, and may be sized generally to fit in fifth wheel hitch. In some embodiments, the bolt 210, the bushings 220, 225, and the end cap 230, respectively, may be formed from a single generally continuous piece, such as a generally continuous and generally rectangular-shaped tubular member. By way of a non-limiting example, the bolt 210, the sleeve 220, and the end cap 230, respectively, may be formed by stamping, which may create a generally smooth, reinforced, tubular structure.

In some embodiments of the present disclosure, the bolt 210 may not receive any shear stress and may only get tensional or compressional stress along the fore-aft direction. It should be noted that when terms fore and aft are utilized herein that is describing the direction of travel of the vehicle in a forward and reverse direction. The bolt 210 may be adjusted for dampening purposes. In some embodiments, the bolt 210 may be rotated it may get greased, and may be rebuilt at the joint for HD loading. The pivot bushing assemblies 102 may be utilized for a hitch roll, a pitch articulation and/or both within a hitch design.

Figure 2B:
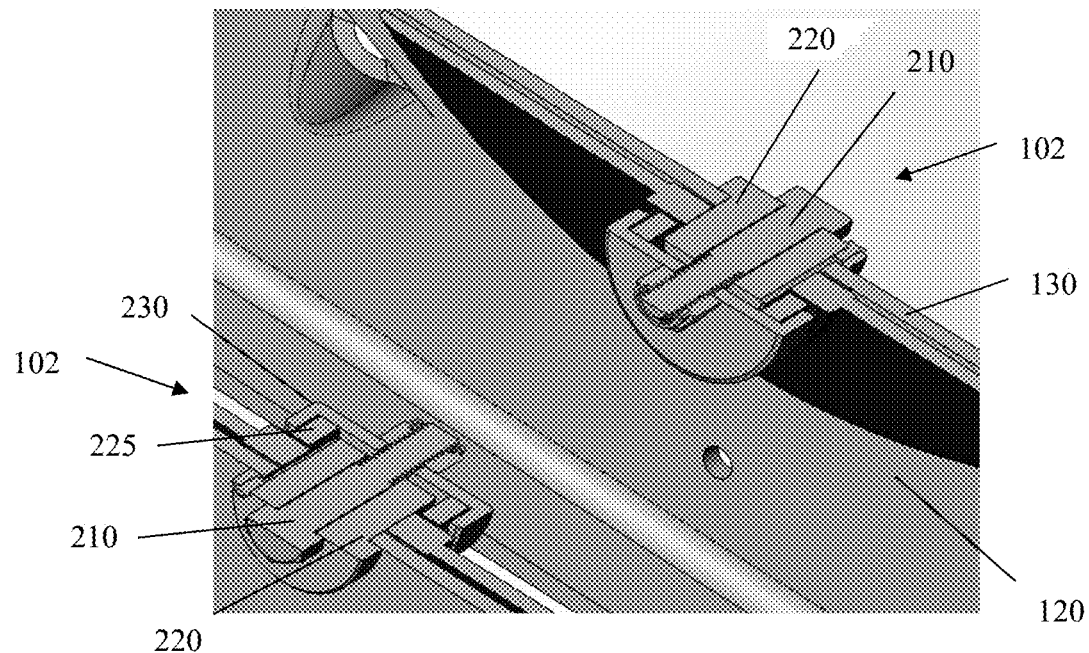
FIG. 2B is a top cross sectional view of front and rear pivot bushings in accordance with various described embodiments.

Referring to FIG. 2B, a pair of pivot bushing assemblies 102 may be of a similar configuration or different configuration and may be substantially similar configuration to the assemblies 102 above. When compared to current state of the art, this pair of pivot bushing assemblies 102 may isolate the fore-aft trailer load, thereby dampening an oscillation. They may also isolate fore-aft trailer load input while controlling travel accurately to not allow undulation and/or overload of the isolator. Further still, these pivot bushing assemblies 102 may create a low rotational force that may keep the fifth wheel hitch from rattling when it is not connected and allow all vertical load structurally without getting an isolation from a large contact area for an increased durability. This may be dependent on vehicle suspension of the towing vehicle in order to avoid a ride harmonics. Finally, the pivot bushing assemblies 102 may further allow load sharing between the front and the rear pivot bushings for more structurally efficient design.

Anti-Rattling, Vertically Adjustable Attachment Members

The fifth wheel hitch may include comfort assembly including features such as those shown in FIGS. 3-6C. In one aspect, the comfort assembly includes a vertically adjustable attachment member 300.

Figure 3:
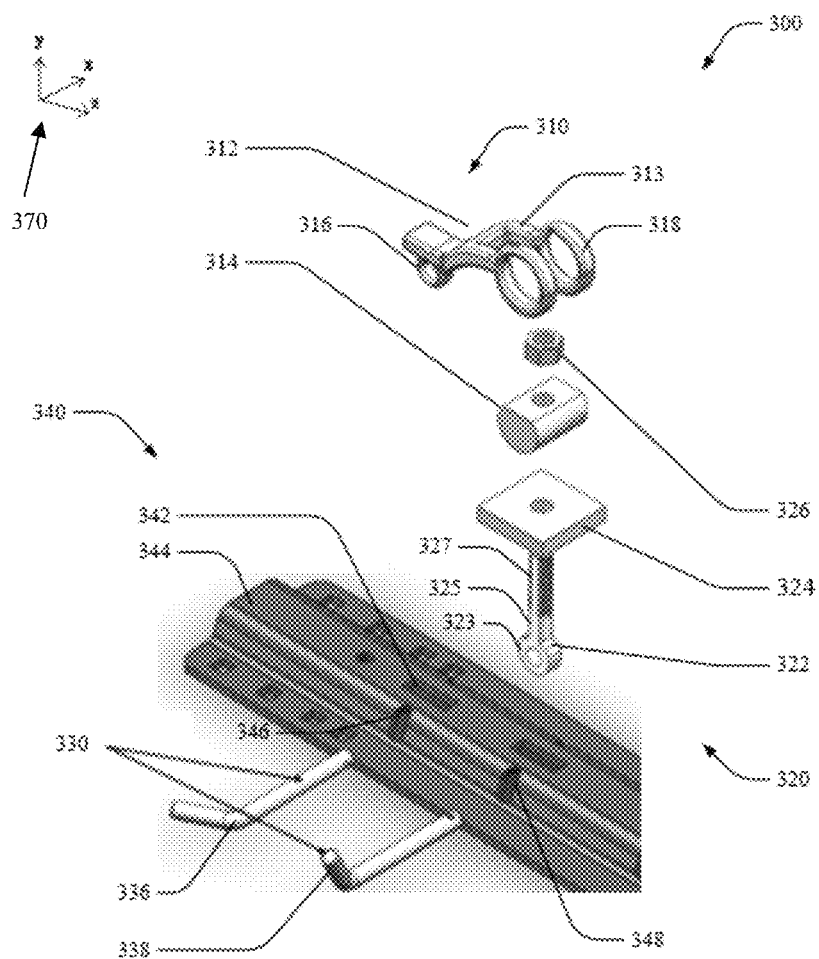
FIG. 3 is an exploded perspective view of a vertically adjustable including a cam assembly in accordance with various described embodiments.
Figure 4:
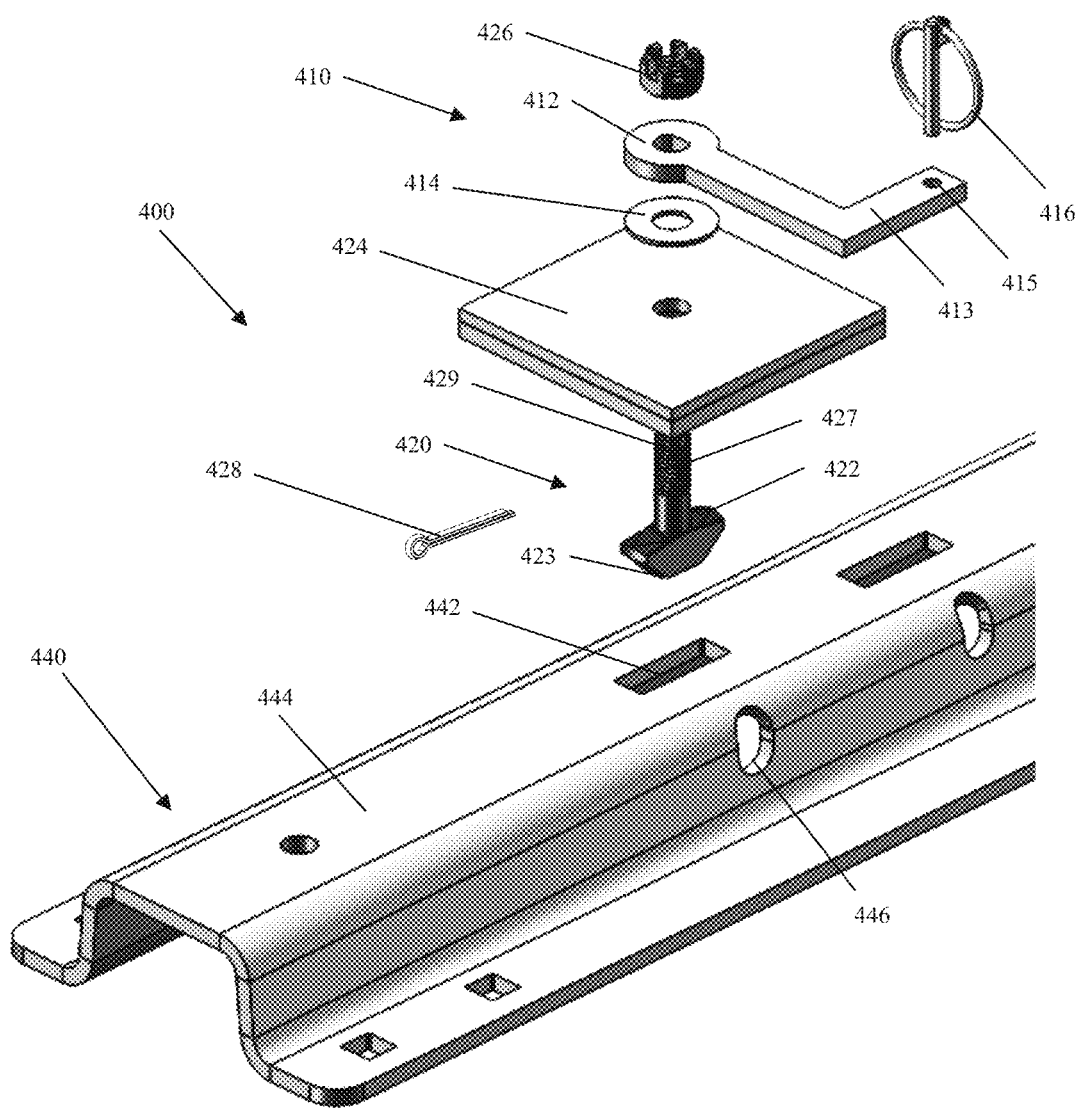
FIG. 4 is an exploded perspective view of a vertically adjustable including a T-pin assembly in accordance with various described embodiments.
Figure 6A:
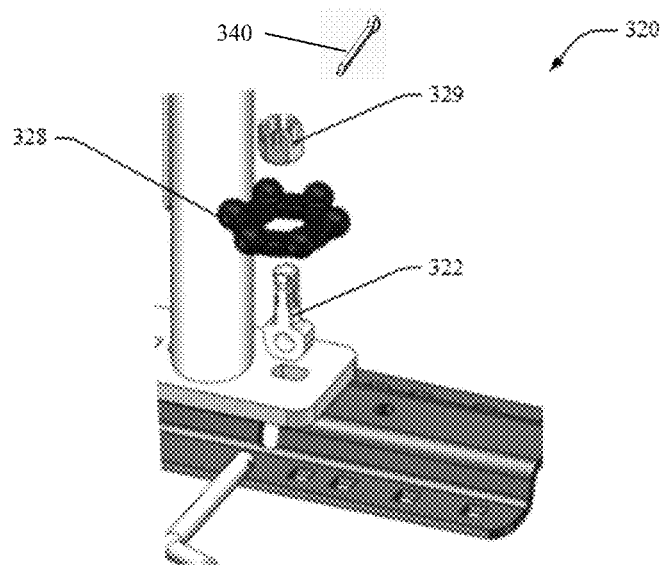
FIG. 6A is an exploded perspective view of a capture pin fastening member in accordance with various described embodiments.
Figure 6B:
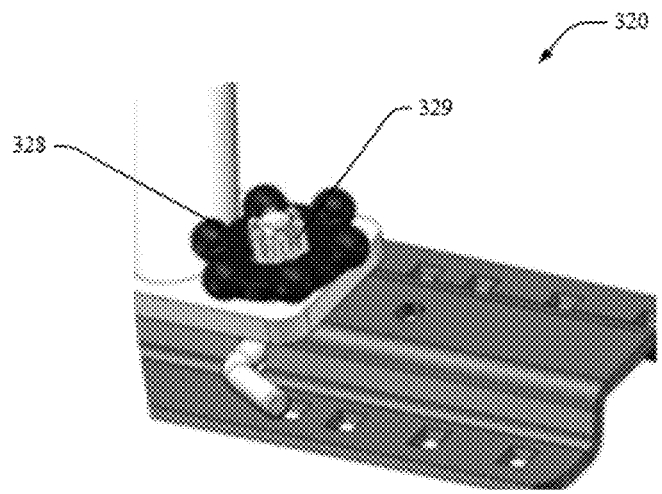
FIG. 6B is a perspective view of the fastening member of FIG. 6A in a locked position in accordance with various described embodiments.
Figure 6C:
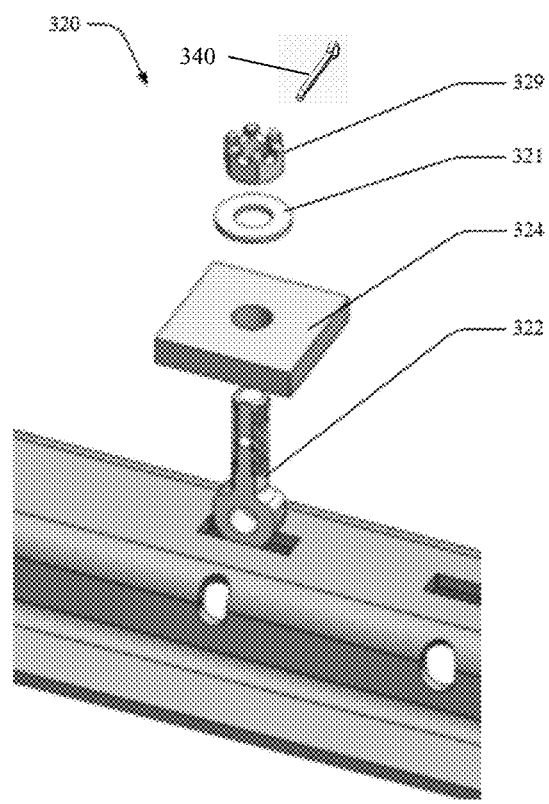
FIG. 6C is an exploded perspective view of alternative capture pin fastening member in accordance with various described embodiments.
Figure 7:
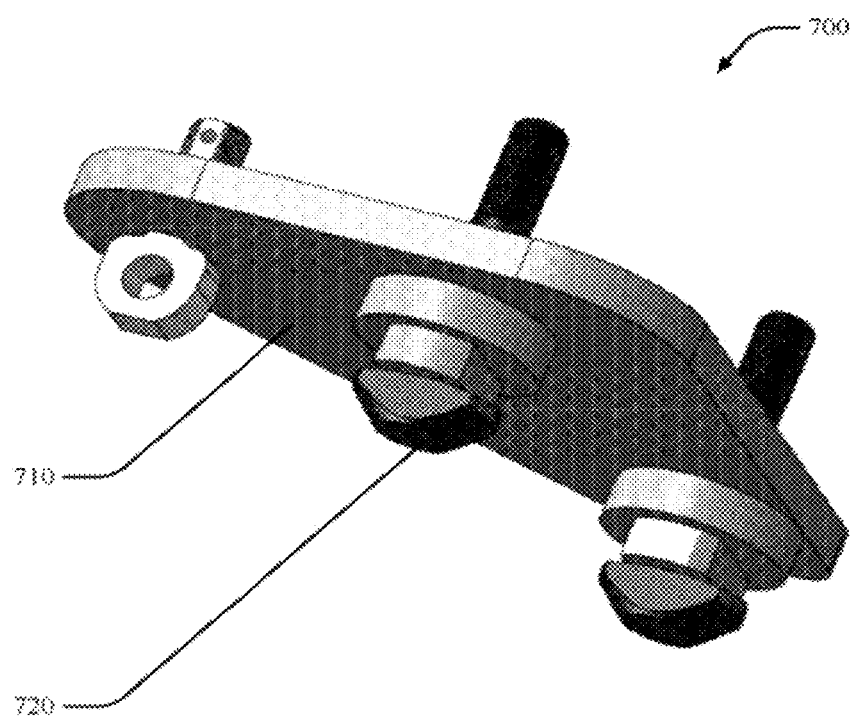
FIG. 7 is a perspective view of a universal mounting apparatus in accordance with various described embodiments.

In FIG. 3, at least one cam assembly 300 is configured to selectively and adjustably engage a kingpin receiving assembly with the mounting rail. In FIG. 4, an alternative T-pin assembly 400 accomplishes the same purposes, while the capture pin fastening member of FIG. 6A-6C illustrates yet another possible way to attach the base plate carrying the hitch to the mounting rail. These configurations reduce rattling sounds that occur in prior art fifth wheel hitches and other similar systems and may be easier to install.

FIG. 3 illustrates one embodiment of the at least one cam assembly 300. The at least one cam assembly 300 may include a cam member 310, a fastening member 320, rail pin members 330, and a rail 340. The cam member 310 may include a cam lever 312 and a cam barrel 314. The fastening member 320 may include a foot 322, a washer 324, and a fastener 326. The cam lever 312 and the cam barrel 314 may be configured to rotate around the foot 322 to allow minor adjustment for the height without adjusting the position of the fastener 326 on the foot 322.

The cam lever 312 may include a lever portion 313 generally arcuate along the z-axis as indicated by directional axes 370. The cam lever 312 may additionally include a first engaging portion 316 extending below lever portion 313. The first engaging portion 316 of the cam lever 312 may be secured to a rail 340 by receiving a first rail pin 336. The first engaging portion 316 may be generally circular or any other appropriate shape. The first rail pin 336 may prevent the cam lever 312 from rotating to the unlocked position while towing. The cam lever 312 may further include a second engaging portion 318 extending above lever portion 313. The second engaging portion 318 of the cam lever 312 may receive a cam barrel 314. Notably, the first engaging portion 316 of the cam lever 312 may be located an opposite end with respect to a second engaging portion 318. When the cam lever 312 is in a locked position via mounting slot 342 located in a center of a rail surface 344, the cam lever 312 may be configured to secure the position of the fastener 326 to help prevent the device from coming out as unattached during the normal use. By way of a non-limiting example, the cam member 310, a fastening member 320, at least one rail pin member 330, and a rail 340, respectively, may be of any appropriate size generally to fit in the towing vehicle.

The fastening member 320 may include the foot 322, the base plate 324, and the fastener 326. The foot 322 may include a pin engagement portion 323. The foot 322 may further include a body 325 extending above the pin engagement portion 323. The body 325 may include threads 327 of any appropriate configuration. By way of a non-limiting example, the base plate 324 and the fastener 326 may be comprised of any appropriate material, including, for example, metal, plastic, rubber, wood or a combination of such. Also, base plate 324 may be integrally formed with or otherwise attach to the leg or some other feature of the fifth wheel hitch (e.g., similar to the one shown in FIGS. 1A and/or 1B). The fastener 326 may be any appropriate item, including, but not limited to nuts such as that shown in FIG. 3. Foot 322 is received in an appropriately size mounting slot to allow for the secure connection of pin 338.

The at least one pin member 330 may include a first rail pin 336 and a second rail pin 338. The first rail pin 336 may be positioned through a first aperture 346 of the at least one aperture of the rail 340 and may be configured to be engaged with the pin engagement portion 316 of the cam lever 312. The second rail pin 338 may be positioned through a second aperture 348 of the at least one aperture of the rail 340 and may be configured to be engaged with the first engaging portion 323 of the foot 322.

Figure 5A:
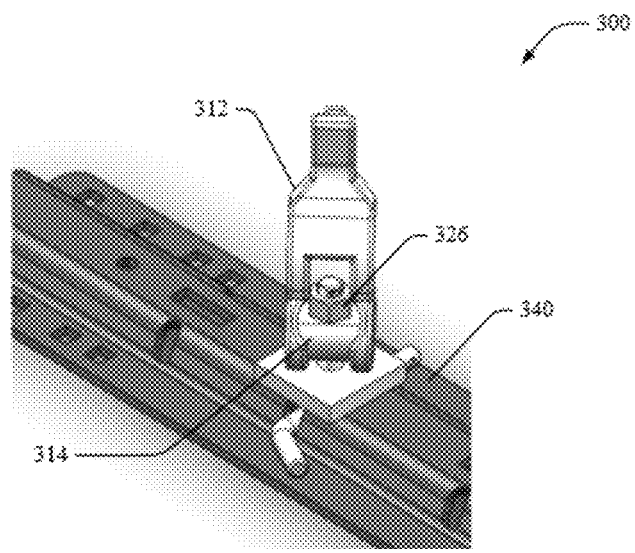
FIG. 5A is a perspective view of the cam assembly of FIG. 3 showing the rotating cam lever in accordance with various described embodiments.
Figure 5B:
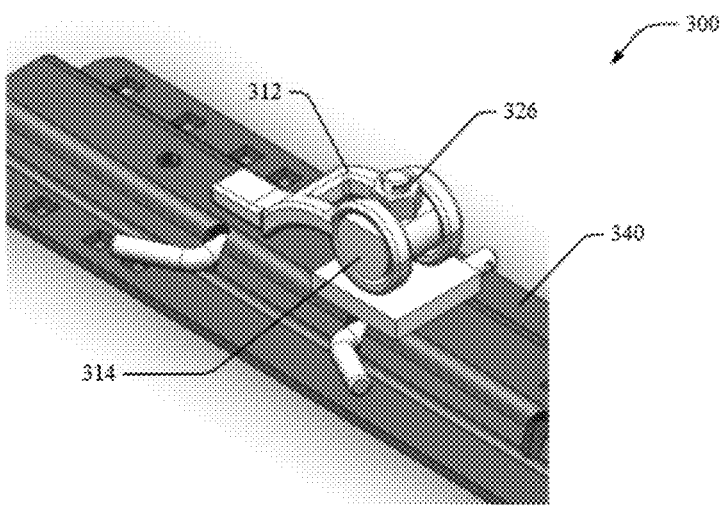
FIG. 5B is a perspective view of the cam assembly of FIG. showing the cam in a locked position in accordance with various described embodiments.

FIGS. 5A and 5B depict perspective views of a non-limiting example of the at least one cam assembly 300 in locked position in accordance with various embodiments described herein. In operation, the at least one cam assembly 300 may allow an adjustment for the tension between the fifth wheel leg/arch/slider and the rail 340. The tension may create a rigid connection between the fifth wheel hitch and the rail 340 such that it generally eliminates rattling between the various components. The at least one cam assembly 300 may additionally allow any adjustments of the height by allowing the cam lever 312 and cam barrel 314 to rotate around the foot 322 without adjusting the position of the fastener 326 on the foot 322. The cam lever 312 when in the locked position may secure the position of the fastener 326 that prevents the device from coming unattached during normal use. This structural arrangement may advantageously allow the cam lever be locked into the rail to prevent it from rotating to the unlocked position when towing. This adjustability may allow for operative fit between the components even when the tolerances thereof would not otherwise match and allow such operative connection, i.e., the adjustability accommodates tolerance stack ups that may occur between the various components.

The cam assembly 300, as described above, allows for the threads 327 to be engaged in a manner that adjusts the vertical height of the overall attachment. In this manner, a towing apparatus such as a hitch can be adjustably and securely engaged in addition to the anti-rattle and anti-vibration features noted above.

FIG. 4 illustrates an alternative that may be used in combination with or in place of the cam assembly 300. Here, handle lock assembly 410 cooperates with T-pin assembly 420. In turn, the T-pin 420 is captured in the rail, but not necessarily with the need to align a pin through the side hole of the rail and the pin itself, as is required by cam assembly 300.

Handle 413 includes a keyway 412 that receives a correspondingly shaped terminal end of T-pin 420. Handle may include a bent, gripping portion, along with a pin hole 415 for receiving a removable cotter or spring pin 416 to secure the handle 413 and prevent unwanted or unintended rotation.

T-pin 420 includes a pair of shoulders 422 at its lower extremity. Shoulders 422 are elongated so as to be received into a mounting slot 442 in the center surface 444 of rail 440. The shoulders 422 may have an anvil shape so as to be secured by a pull pin (not shown) inserted through aperture 446. Shoulders 422 or indent 423 on the foot of pin 420 may include flattened portions so as to conform to the pin to secure the pin without rotation, or the pin 420 may be rotated a quarter turn to allow the pin to engage the length of the foot of the pin 420 while the shoulders 422 capture and engage an underside of rail 440 adjacent the slot 442. In either instance, the T-pin 420 is secure within the mounting slot 442 of the rail 440 without the need to thread a pull pin through an in any part of the pin 420. Additionally, a pin 428 may be received through aperture 429 in the T-pin 420 and a corresponding aperture in fastener 426 so that, when installed, the pin 428 prevents rotation or movement of the T-pin 420 and locks the vertical adjustment in place.

Adjacent to the foot of pin 420 along its length, a central body transitions to threaded portion 427 in the upper portion of pin 420. This upper portion passes through a base plate 424 (which is similar to base plate 324 described above). A washer 414 may more evenly distribute forces exerted by fastener 426 and/or handle 413. The upper end of pin 420 may be shaped to be engaged by keyway 412 to selectively control rotation of pin 420. In the same manner, castle nut or other fastener 426 may engage the threads 427 to allow for vertical adjustment and compression of the T-pin 420. In some embodiments, the nut 426 may be integrated into the handle, by way of counter-sunk bores in the keyway, attachment or formation of a similar component on the handle itself, or by other known methods.

Referring to FIGS. 6A-6B, a hand actuated engagement and tightening device 328 (e.g., a "faucet knob," gripping annulus, and/or other similar structures) and a partially protruded fastener 329 may be configured to rotate around the foot 322 to allow minor adjustment for the height without adjusting the position of the partially protruded fastener 329 on the foot 322. The engagement of the partially protruded fastener 329 into the foot 322 may lock and/or selectively lock the fastening member 320. By way of a non-limiting example, the faucet knob 328 and the partially protruded fastener 329 may be comprised of any appropriate material, including, for example, metal, plastic, rubber, wood or a combination of such. The faucet knob 328 and the partially protruded fastener 329, respectively, may be of any appropriate size generally to fit in the towing vehicle. In this manner, further vertical adjustment of the capture pin 322 can be achieved. As above, pin 340 may be provided to pass through apertures in the fastener 329 and foot 322 to prevent rotation, movement, or loss of the fastener 329.

In other embodiments, as shown in FIG. 6C, the fastening member 320 may include the foot 322, the base plate 324, a round washer 321, and the partially protruded fastener 329, as well as a pin 340 to lock the fastener 329 in place via appropriate apertures in the fastener 329 and foot 322. Any combination of the embodiments disclosed above may be contemplated herein and may be utilized together. For the sake of brevity, not every combination is described in detail, but all such combinations are contemplated by this disclosure.

While the specific details of assemblies 300 and 400 above, these are merely exemplary embodiments and that the present system may utilize any appropriate configuration. It may also be possible to utilize a combination of one or both systems on each rail of the vehicle. While only a single assembly is shown in each of the FIGS. 3-6C for the sake of brevity, the present teachings contemplate the use of any number of assemblies 300 and/or 400, e.g., two, three, four, five, six, seven, eight, etc., can be used, with four assemblies preferred in order to lock down a fifth wheel hitch.

Notably, each of the assemblies 300, 400 and the various possible iterations described herein allow for simplified connections with minimal effort. Further, these assemblies allow for some level of vertical adjustment without significant reconfiguration of the attachment itself. Finally, as noted above, the securing methods are generally less susceptible to rattling, vibration, and noise in comparison to more conventional attachment means.

Universal Mounting Apparatus.

A universal mounting apparatus 700 may provide a custom fit with the frame of substantially any towing vehicle. The universal mounting apparatus 700 according to the present disclosure is significantly universal and can be adapted to a wide variety of the towing vehicle types and models. In its preferred embodiment, the universal mounting apparatus 700 comprises a mounting plate 710 as well as several auxiliary components 720 to mount the selected towing vehicle types (e.g., Elite mounting system, Ford Underbed, Ram Underbed, GM Underbed, InBoard-ISR, Industry Standard Above Bed Rail, OutBoard-ISR, and other similar systems as known in the art) to the mounting plate.

One part number may be used to fit two or more mounting systems. One stocking number may further be used for multiple applications for manufacturing, warehousing, and/or customer stocking. Although different mounting designs may be required for different vehicle makes and models, the side brackets, shaft supports and trim rings may be interchangeable. This results in fewer and less complex molds and thus minimizes manufacturing costs.

Further, the various embodiments may be combined to be utilized on a single fifth wheel hitch system operatively coupled with the towing vehicle. Any combination of the embodiments disclosed above are contemplated to be utilized together. For the sake of brevity, not every combination is described in detail, but all such combinations are contemplated by this disclosure.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A vertically adjustable, anti-rattle attachment assembly for connecting a fifth wheel hitch to a vehicle mounting rail having a side connection aperture and a mounting slot on a top facing of the mounting rail, the attachment assembly comprising:
   an attachment bolt having a foot end and an opposing upper end, said bolt received through an aperture in a base plate associate with the fifth wheel hitch;
   wherein the foot end includes a loop with opposing flattened faces, said flattened faces cooperating to be received within the mounting slot so that a pull pin, when inserted through the side connection aperture proximate to the mounting rail, passes through the loop; and wherein the upper end includes a threaded portion to receive a fastener, said fastener being selectively coupled to the threaded portion so as to adjust a vertical positioning of the assembly.

2. The attachment assembly of claim 1 further comprising a cam lever having a cam barrel rotatable in response to movement of the cam lever and wherein the attachment bolt passes through the cam barrel so that the cam barrel is positioned between the fastener and the base plate.

3. The attachment assembly of claim 2 wherein the cam lever includes a looped protrusion having flattened faces cooperating to be received by a second mounting slot on a top facing of the mounting rail proximate to the mounting slot so that a second pull pin, when inserted through a second side connection aperture proximate to the second mounting slot, passes through the looped protrusion.

4. The attachment assembly of claim 2 wherein the cam barrel is integrated as a single piece with the fastener.

5. The attachment assembly of claim 1 further comprising a faucet knob engaging the fastener so as to rotate in concert therewith.

6. A vertically adjustable, anti-rattle attachment assembly for connecting a fifth wheel hitch to a vehicle mounting rail having a side connection aperture and a central mounting slot on a top facing of the mounting rail, the attachment assembly comprising:

a T-pin having a foot end and an opposing upper end, said T-pin received through an aperture in a base plate associate with the fifth wheel hitch;

wherein the foot end includes an elongated base having a pair of opposing shoulder, said shoulders cooperating to be received within the mounting slot and sized so as to allow for rotation of the elongated base within an inner channel along an underside of the mounting rail;

wherein a pull pin is selectively received through the side connection aperture proximate to the mounting rail, said pull pin engaging the elongated base to prevent rotation of the T-pin; and wherein the upper end includes a threaded portion to receive a fastener, said fastener being selectively coupled to the threaded portion so as to adjust a vertical positioning of the assembly.

7. The attachment assembly of claim 6 further comprising a handle assembly having a keyway aperture, said keyway aperture receiving the upper end of the T-pin.

8. The attachment assembly of claim 7 wherein the keyway aperture is integrated as a single piece with the fastener.

9. The attachment assembly according to claim 7, wherein the handle includes a second aperture that receives a locking pin to prevent rotation of the handle when the locking pin is inserted in the second aperture.

10. The attachment assembly of claim 7, wherein the keyway engages the upper end to selectively rotate the T-pin so as to secure the elongated based in the mounting rail.

* * * * *